United States Patent [19]

Scoville

[11] 4,329,215

[45] May 11, 1982

[54] SODIUM HYPOCHORITE PRODUCTION AND STORAGE SYSTEM

[76] Inventor: Frank Scoville, 4646 S. 3075 E., Salt Lake City, Utah 84117

[21] Appl. No.: 159,055

[22] Filed: Jun. 13, 1980

[51] Int. Cl.³ .......................... C25B 15/08; C25B 9/00
[52] U.S. Cl. ................................... 204/229; 204/258; 204/266
[58] Field of Search ................................ 204/228–229, 204/252–258, 263–266, 271, 151

[56] References Cited

U.S. PATENT DOCUMENTS

| | | | |
|---|---|---|---|
| 1,319,734 | 10/1919 | Thorold et al. | 204/229 |
| 2,701,790 | 2/1955 | Goument | 204/95 X |
| 3,210,262 | 10/1965 | Klein | 204/95 X |
| 4,129,493 | 12/1978 | Tighe et al. | 204/228 |
| 4,136,005 | 1/1979 | Persson et al. | 204/266 |
| 4,144,161 | 3/1979 | Bourgeois | 204/229 |
| 4,196,068 | 4/1980 | Scoville | 204/128 X |

*Primary Examiner*—Delbert E. Gantz
*Assistant Examiner*—Donald R. Valentine

[57] ABSTRACT

System for the production and storage of sodium hypoclorite consisting of a source of soft or deionized water, a storage tank of saturated salt brine solution, a storage tank for soft or deionized water, an electrolytic chlorine generation unit wherein the saturated salt and soft water from the storage tanks react at the anode and cathode respectively to produce chlorine gas and sodium hydroxide as the main products, means for mixing chlorine and sodium hydroxide to form sodium hypochlorite and a storage tank where the sodium hypoclorite is stored. Pumps or valves for transport of the saturated salt brine and the soft water to the electrolytic unit, piping or tubing for intermixing the chlorine gas and sodium hydroxide, float valves or other valve devices in the storage tank to regulate the volume input are also included as part of the system. A power unit regulates the flow of liquids through the system and operates the electrolytic chlorine generation unit.

7 Claims, 3 Drawing Figures

SODIUM HYPOCHORITE PRODUCTION AND STORAGE SYSTEM

BACKGROUND OF THE INVENTION

This invention relates to a system for producing and storing sodium hypochlorite for use as a sanitizing solution.

There is a constant need for the production of sanitizing chemicals for both industry and home use. Dairies, food processing plants, bottling plants and swimming pools all require large volumes of chlorine, which is usually supplied as an aqueous hypochlorite solution. Sodium hypochlorite is the most prevalent of these chemicals and is made by reacting sodium hydroxide with chloride in an aqueous environment according to the following equation:

$$2\ NaOH + Cl_2 \rightarrow NaOCl + NaCl + H_2O$$

The generation of chlorine and sodium hydroxide is usually carried out in large commercial electrolytic cells and the resulting aqueous sodium hypochlorite is bottled or processed for bulk shipment. This is expensive as large amounts of water must be transported and the solution is caustic and dangerous to handle.

One method of on-site generation of chlorine to lessen this problem is taught in U.S. Pat. No. 3,819,329 issued June 25, 1974. In this patent, a saturated saline solution and fresh tap water are admixed prior to introduction into electrolytic cells. Separate introduction is not needed because the anode and cathode compartments in the cells are not separated. Instead, the reactants enter a common cell and products exit intermixed. The resulting products are hypochlorous acid, sodium hypochlorite, hydrochloric acid and other by-products. Because of the addition of acetic acid to the brine solution prior to its introduction into the cell, the saturated salt solution enters the cell with a pH of 6.0. By lowering the pH, the product solution constitutes primarily hypochlorous acid, a relatively unstable compound. Its inherent instability requires its immediate use by means of the spray system set forth in the patent. The objective of the patent was to eliminate the need for storage and preservation and instead produce an unstable hypochlorous acid. However, in many instances, it is both desirable and preferable to produce and use a more stable chlorine compound which is capable of storage. The system of the present invention will eliminate many time-consuming steps as well as the need to use immediately that chlorine which is produced.

SUMMARY OF THE INVENTION

It is the primary objective of the present invention to provide an essentially automatic system for the production and storage of sodium hypochlorite.

A further object of the present invention is to produce and store the chlorine requirements for the use to which the system will be put.

A still further object of the invention is to provide a system for the electrolytic production and use of sodium hypochlorite solutions wherein the quantity of sodium hypochlorite produced is automatically regulated to coincide with the amount required for use.

For water purification purposes, differing amounts of sodium hypochlorite are necessary depending on the amount of water, temperature of the water and impurities in the water. Once such conditions have been analyzed and the sodium hypochlorite level determined, the production system may be regulated by means of a cyclical timing device so that there is always present in storage the amount required for purification. To continue the automatic operation of a sodium hypochlorite production system, storage is necessary. This alleviates many more hours spent in tasks which can now be carried out by the system. Storage is feasible when sodium hypochlorite is the disinfectant because of its stable nature.

The objectives of the invention are met by a system beginning with a soft or deionized soft water source which feeds water both to a salt brine tank where the soft water and technically pure sodium chloride are mixed to give a saturated salt solution and to a soft water storage tank. The water and saturated brine are each sent at differing flow rates by valves or pumping means into an electrolytic chlorine generation unit giving as reactant products chlorine gas and sodium hydroxide. By separate exit ports products from the electrolytic unit enter a common line where intermixing of chlorine and sodium hydroxide occurs forming sodium hypochlorite as the reactant product. The line carrying the sodium hypochlorite leads into a storage tank from which the sodium hypochlorite is withdrawn either by hand or by pump in the amount required for purification or sanitation purposes.

DRAWINGS OF THE INVENTION

DETAILED DESCRIPTION OF THE INVENTION

Figure 1:
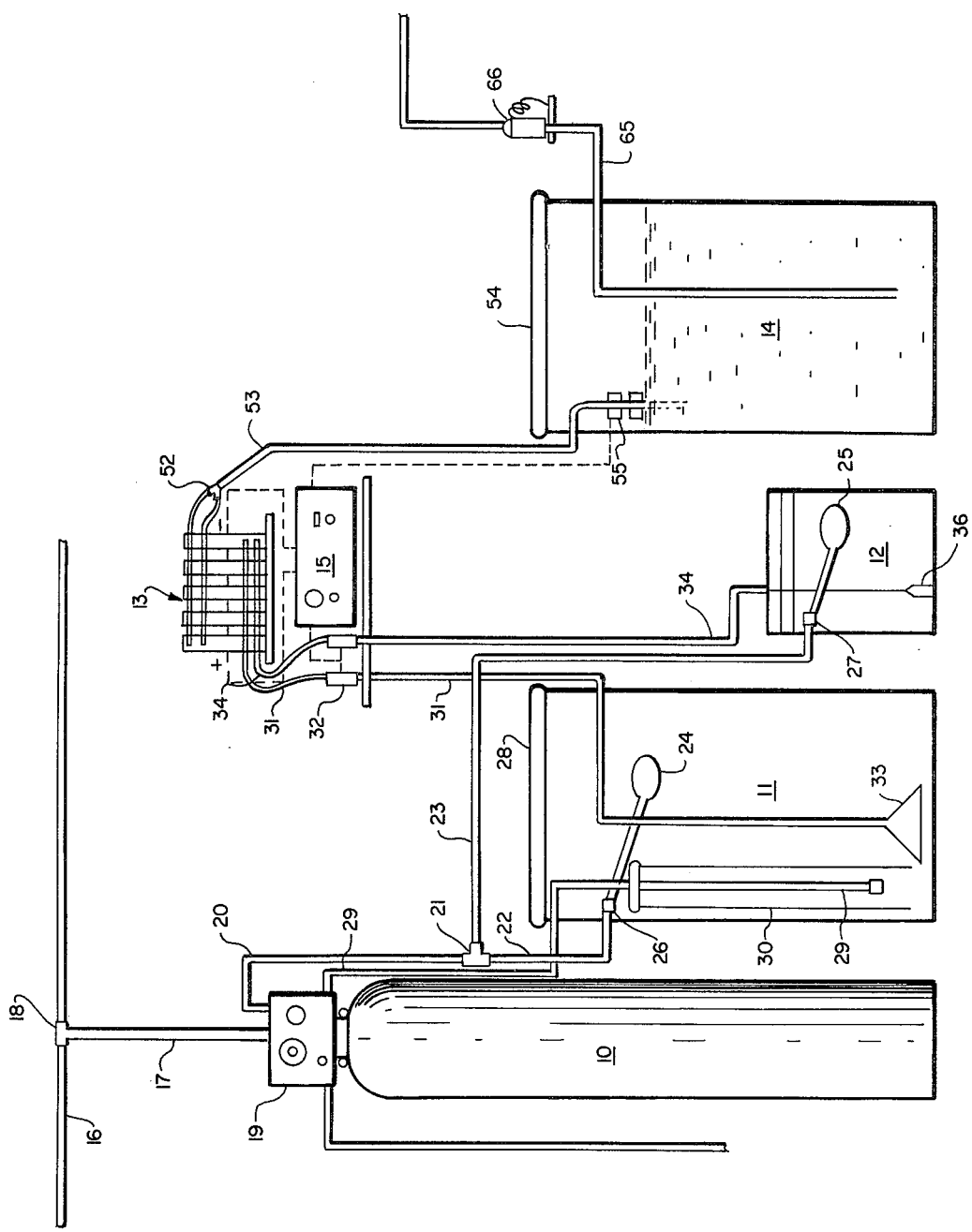
FIG. 1 is a schematic diagram of the invention showing the various units and how they are interconnected.
Figure 2:
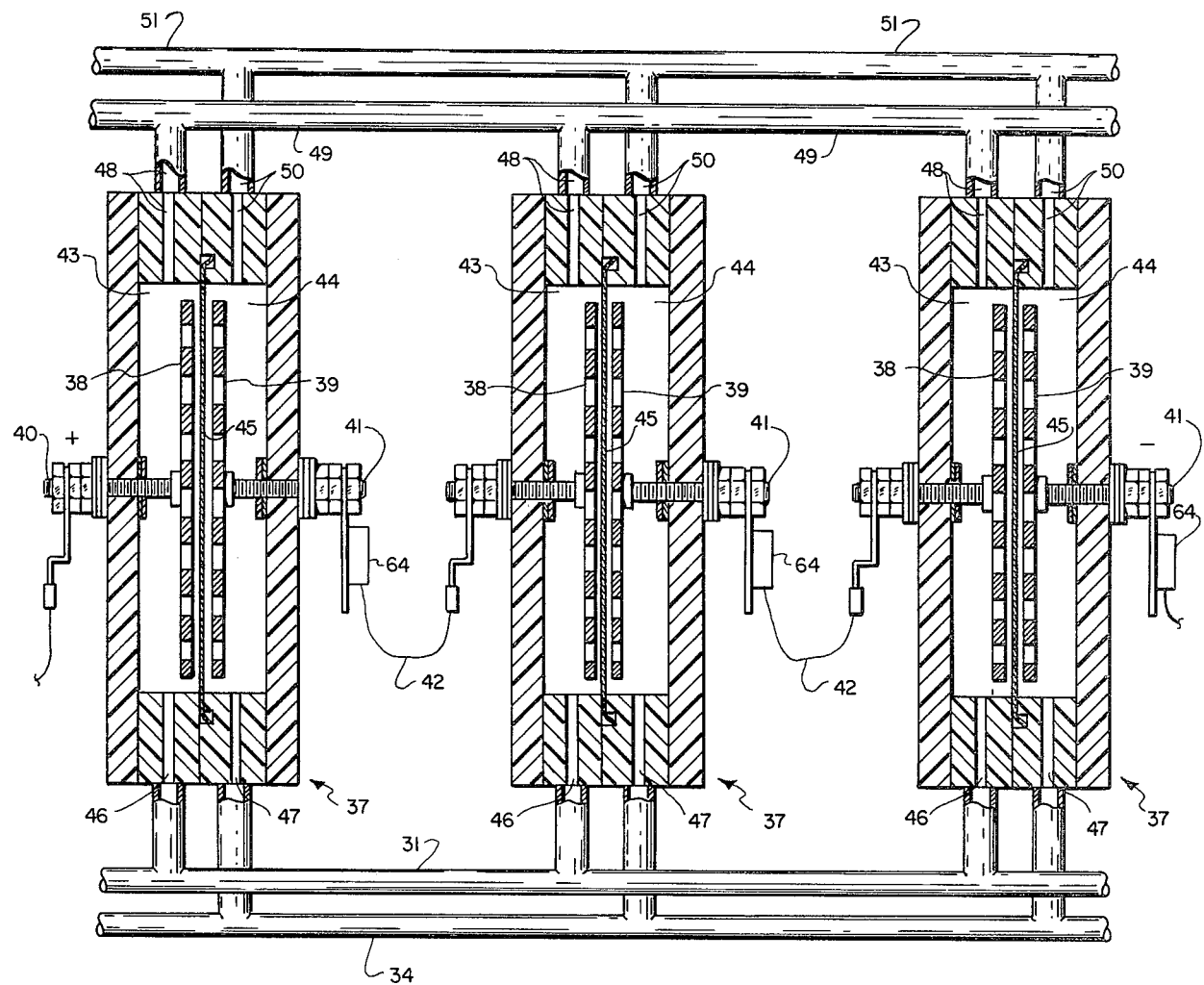
FIG. 2 is a cross-sectional view of a preferred electrolytic cell unit for use in the system.
Figure 3:
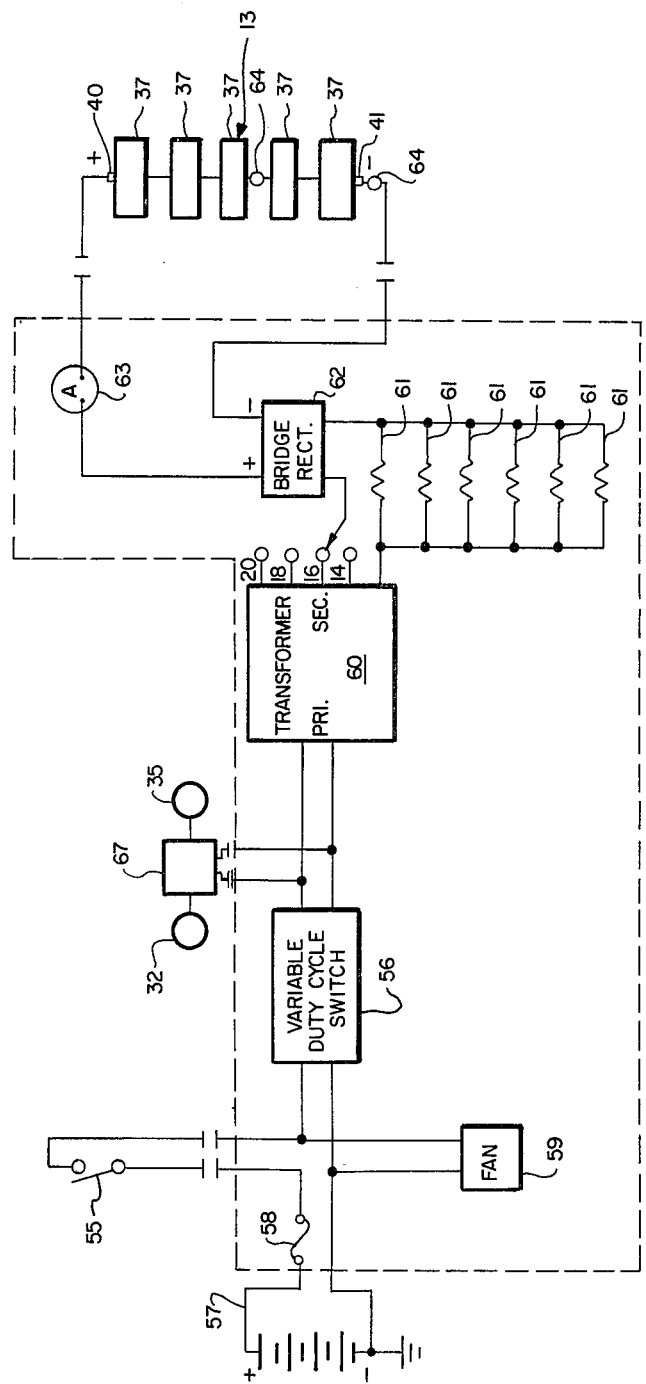
FIG. 3 is schematic diagram of the electrical system necessary for operating the pumps and electrolytic cells on a programmed basis.

There is shown in FIGS. 1-3 a complete and preferred embodiment of the invention. As shown in FIG. 1, the system comprises a water softener 10, a brine storage tank 11, a water container 12, an electrolytic unit for producing chlorine 13, a sodium hypochlorite storage tank 14 and a power unit 15 along with accompanying valves, pumps and lines necessary to interconnect the system as will be described.

Water purification unit 10 may be conventional water softener utilizing an ion exchange resin to remove calcium and magnesium ions. Unit 10 is connected to a water supply source 16 via line 17 by means of a saddle or other valve 18. Unit 10 has a control unit 19 which may be manually or automatically actuated for regeneration purposes.

Soft water from unit 10 passes via line 20 to tee 21 where it divides to pass via line 22 to brine tank 11 and via line 23 to water storage tank 12. Flow of soft water to tank 11 and 12 is controlled by floats 24 and 25 which actuate float valves 26 and 27.

The brine storage tank 11 should preferably be made of a non-corrosive material such as any plastic or fiber glass and have a removable lid 28 whereby salt may be added to maintain a saturated salt solution. The amount of salt will depend upon the size of storage tank 11. It is suggested that 200 pounds of salt be present in a tank which could contain anywhere from 15 to 30 gallons of saturated salt solution depending on the use to which the system will be put. A pipe or tube 29 extends into the brine storage tank 11 and is connected to water softener 10 to serve as a means by which the resin in the water softener is periodically regenerated by sodium ions. All lines, floats and valves in contact with soft water should be made of plastic or other non-corrosive material. A brine well 30 is located within the brine storage tank 11 to prevent salt from entering line 29 which backflushes the brine into the water softener 10 during regeneration. The float 25, float valve 27, the water storage tank 12, and the line 23 by which soft water feeds into it need not be of non-corrosive material necessary in a saline atmosphere. However, for purposes of convenience and expense, these might easily be made of the same plastic or fiber glass from which the tubing to and from the brine storage tank 11 and the brine storage tank itself is made. The soft water storage tank 12 preferably holds anywhere from 5 to 20 gallons but might hold more depending on the use to which the system will be put, whether commercial, requring more sodium hypochlorite production or simply for the domestic or homeowners use in a small swimming pool requiring less production.

Brine tank 11 and water tank 12 provide the feed solutions to electrolytic chlorine generation unit 13. Brine tank 11 and generator 13 are connected by means of line 31 and valve or pump 32. Line 31 contains a filter 33 at the lower end thereof at the bottom of tank 11 to prevent salt crystals from clogging pump 32 or entering generator 13. Similarly line 34 and valve or pump 35 interconnect water tank 12 with chlorine generator 13. Line 34 also preferably contains a filter 36 to prevent any foreign matter from entering pump 35 or generator 13. When pumps 32 and 35 are used to move brine and water through lines 31 and 34, they may each be preset to pump at a given rate and operated in tandem by a single pump motor. When gravity flow or other means which do not require the use of pumps is used, valves with preset openings may replace pumps. However, this method is less effective in controlling flow rates. When valves are employed, they should preferably be one way or check valves which prevent back flow.

The electrolytic generator 13 used in this particular system may be any of those presently in use in the art which will accept the introduction of saturated salt brine and soft water in separate cell compartments to produce chlorine and sodium hydroxide which is withdrawn from the cell and intermixed to produce sodium hypochlorite. Typical generators are disclosed in U.S. Pat. Nos. 4,062,743; 4,029,565; 4,025,405; 4,057,474 and 4,196,068. The generator may be a single cell or have multiple cells depending upon the capacity of each cell and the amount of sodium hypochlorite to be generated.

For the purposes of describing this system and as a preferred electrolytic unit, specific reference will be made to the unit disclosed in U.S. Pat. No. 4,196,068 issued Apr. 1, 1980. A multiple cell unit is described, but the description could apply to a single cell unit with the exception that the electrical connections will not be in series.

As shown in FIG. 2, the preferred electrolytic unit 13 consists of a series of separately housed electrolytic cells 37 each containing an anode 38 and a cathode 39 which are electrically interconnected in series with an anode connection 40 at one end of the series and a cathode connection 41 at the opposite end. Each cell 37 of the series is separately housed from the others and is electrically connected to an adjacent cell by a conductive electrical connection 42 linking anodes 38 and cathodes 39 of adjacent cells. Within each of the cells 37 is anode compartment 43 and cathode compartment 44 which are separated by an ion exchange membrane 45 which is impermeable to anions and preferably to gases and liquids also. A saturated salt brine solution from line 30 enters each of the anode compartments 43 in parallel by passageways 46. Similar passageways 47 exist for the introduction of soft or deionized water into the cathode compartments 44 from water line 34. The separation of the anode and cathode compartments necessitates the separate introduction of the saturated salt brine solution and soft water but also allows for the separate removal of chlorine gas and spent brine from the anode compartment 43 through passageways 48 to collection line 49 and sodium hydroxide and hydrogen gas from the cathode compartment through passageways 50 to collection line 51.

Collection lines 49 and 51 preferably merge at a tee 52 into a single line 53 leading to storage tank 14. Chlorine gas rapidly reacts with sodium hydroxide in line 53 to form sodium hypochlorite which is then stored in tank 14 for use as needed.

The chlorine and spent brine collection tube 49 and the sodium hydroxide collection tube 51 in the preferred embodiment are made of Telfon due to temperature and chemical considerations. By means of a connection or joint 52 these two tubes join into one line 53 also made of Teflon in the preferred embodiment. The sodium hypochlorite storage tank 14 is made of noncorrosive plastic or fiber glass and is sized according to the storage needs. For most uses, tank 14 holds anywhere from 15 to 30 gallons but may hold more. Tank 14 preferably has a removable lid 54 which is sealed to prevent the escape of chlorine gas. To help in the regulation, storage and production of the sodium hypochlorite a float switch 55 is located at the desired level in the sodium hypochlorite storage tank 14. Switch 55 is electrically connected to the power plant 15 and when activated, due to the sodium hypochlorite level in the tank 14, stops the operation of the electrolytic unit 15 and also stops the operation of pumps 32 and 35. A line 64 containing a pump 66 or other means is used to withdraw sodium hypochlorite from storage tank 14 as needed.

The production of sodium hypochlorite within the system is controlled by power unit 15 which operates the electrolytic generator 13 and also regulates the flow of liquids through the system. FIG. 3 schematically shows how the various electrical components are interconnected to produce the desired results. The components inside the broken line are all housed within power unit 15.

Alternate switches for regulating chlorine production are included within the system. These switches may be used separately or in combination.

Power unit 15 is connected to a 110 Volt power source 57 through a line containing a circuit breaker or fuse 58 which protects the unit against surges of current. Float switch 55, if one is desired, prevents the flow of electricity through the unit 15, pumps 32 and 35 and generator 13 when the sodium hypochlorite in storage tank 14 is at a preset level. When that level drops switch 55 closes and operates cooling fan 59 while supplying electricity to either a variable duty cycle switch 56 if one is included, or to the remainder of the system if switch 56 is excluded. For operation of the system only one of switches 55 and 56 is necessary. However, for some systems, one switch may be preferable over the other. For example, if it is desired to have chlorine generator 13 operate at peak rates of production, whenever the sodium hypochlorite level in tank 14 dropped the variable duty cycle switch could be eliminated. Thus, when the liquid level in tank 14 lowered float switch 55 the unit 13 would operate at maximum production until the preset sodium hypochlorite level was again achieved at which time the unit would close down. When maximum production is not required, as in the case of adding sodium hypochlorite to a swimming pool frequently but in small amounts, it is desirable to have a variable switch with a multitude of settings. Switch 56 is such a switch and is sometimes termed an "infinite" switch. A variable timing cycle within switch 56 allows the generator to be operational over cyclical periods of time to function at about the same rate that the sodium hypochlorite solution is being used. This may vary from about 7 to 100% of rated production. Thus if a swimming pool requires the incremental introduction of "x" volume of a 3% sodium hypochlorite solution per day, switch 56 may be set so that generator 13 operates to incrementally produce "x" volume of hypochlorite per day. Typical of infinite switches is Robertshaw Control's Model No. INF-120-638 which has seven settings allowing for 100, 55, 46, 37, 27 and 7% respectively of rated production.

It may be advantageous to employ both a float switch 55 and an infinite switch 56 within the same system. Then, if for any reason infinite switch 56 was set to produce more sodium hypochlorite than was actually withdrawn from tank 14 during a given period of time, float switch 55 would prevent infinite switch 56 from becoming actuated and producing more hypochlorite solution than is desired.

If switch 56 is included within the system, the electrical leads for fan 59 may be repositioned to operate the fan only when electricity is flowing through switch 56.

As previously mentioned, pumps 32 and 35 may be separately operated or combined so as to operate from a single pump motor 67. Regardless of number of pumps and motors involved, they are electrically connected to unit 15 to operate only when commanded to by the closing of switches 55 or 56. As shown by FIG. 3, fan 59 and pumps 32 and 35 operate from alternating current.

Since generator 13 operates from a constant flow of direct current, it is necessary to provide unit 15 with means to supply direct current at the desired amperage. Such means comprises a step-down transformer 60 to provide the desired voltage. Since voltage is a function of the current density at the electrodes and will vary according to the size of the electrodes and the number of separate cells 37 within generator 13, the voltage may vary and will be determined for each size unit. For most units within this invention, a current of 10 to 30 amperes is adequate; and the transformer 60 will be set to provide the necessary voltage. A series of resistors 61 are provided to control and assure an even current flow.

The constant flow of alternating current from transformer 60 and resistors 61 is converted to direct current in bridge rectifier 62. An ammeter 63 monitors the flow of current and provides a constant visual readout.

The direct current from unit 15 is supplied to generator 13 in series with the positive current being applied to the anode of the endmost cell 37 via connector 40 and the negative current being applied to the cathode of the cell at the opposite end of the generator via connector 41.

The operation of unit 13 is detailed in U.S. Pat. No. 4,196,068 and is incorporated herein by reference. Preferred temperatures of operation within cells 37 of unit 13 is between about 100 and 120 degrees Fahrenheit. However, if the salinity of the brine solution drops due to the clogging of lines or failure to add salt to tank 11, the resistance within cells 37 will increase causing the cells to become heated to too high temperatures. Blockage of lines by foreign particles will inhibit water or brine flow and also cause temperatures within cells 37 to rise.

Temperature control in the cells is brought about by the flow of brine and water through the cells. If, for any reason, the temperature rises above about 160 degrees Fahrenheit, the unit 13 will not function properly and may be damaged. To prevent excessive temperatures, one or more cells 37 in the unit preferably contains a thermal switch 64 attached to the cathode. Since cathode 39 is preferably made of stainless steel, it is a good heat conductor. Therefore, a thermal switch containing a conductive material such as aluminum and attached to the post of the cathode will be responsive to the temperature of the cathode. Depending upon its location, thermal switch 64 will either electrically interconnect the negative DC current source with the end cathode of the unit or will be interspersed between the cathode end of connector wire 42 located between two cells and the cathode that wire 42 would normally connect to. Thermal switch 64 opens at a preset temperature such as 160 degrees Fahrenheit thereby preventing the flow of current through unit 13. However, pumps 32 and 35 continue to supply brine and soft water to the cells allowing the cells to cool. When the temperature of the switch 64 drops to a predetermined level, such as about 140 degrees Fahrenheit, the switch closes restoring the electrical circuit. Thus, damage to unit 13 is prevented until the cause of the heating is found and the problem rectified.

The efficiency of the electrolytic unit is greatly increased by the use of soft or deionized water in tank 12 because calcium and magnesium ions, when present, deposit on the cathode and reduce or inhibit its ability to function. The periodic flushing of the cathode compartments with a weak solution of hydrochloric acid (muriatic acid) will remove any deposition of calcium or magnesium ions from the cathode. Also the periodic regeneration of water softener 10 will maintain the water entering brine tank 11 and water tank 12 at zero grain hardness.

The flow rate of the saturated salt and soft water through lines 31 and 34 to unit 13 is regulated by adjusting pumps or valves 33 and 35 to maintain the desired ratio of brine in the anode compartment 43 and water in cathode compartment 44 to provide the desired concentration of sodium hypochlorite in the final product. In many food sanitation applications, a 3% chlorine solution is required. The following flow rates and currents have been found useful to provide 3% chlorine concentration in sodium hypochlorite solutions in certain five cell units.

| Unit | Current Amps | Flow Rate in Mls/Min Brine | Water | Volume* Gal./Day |
|---|---|---|---|---|
| A | 10 | 6.7 | 19.0 | 9.8 |
| B | 20 | 17.1 | 41.8 | 22.4 |

-continued

| Unit | Current Amps | Flow Rate in Mls/Min | | Volume* Gal./Day |
|---|---|---|---|---|
| | | Brine | Water | |
| C | 30 | 25.4 | 62.8 | 33.4 |

*Continuous operation

In each of the above units, chlorine production was steady after a brief warming period. Cell temperatures and voltages also remained steady.

If desired, certain monitoring equipment and automation may be added to the system without departure from the scope of the invention. For example, the constant monitoring of pH and chlorine content in a larger swimming pool by sensors such as pH or ion specific electrodes or photoelectric cells accompanied by the automated feeding of acid or sodium hypochlorite into the pool in response to the sensors may be utilized.

While the invention, as has been described, is considered to be a preferred embodiment, other variations or equivalent equipment within the system which accomplishes the same purpose may be substituted without departing from the scope of the invention which is to be limited only by the claims appended hereto.

I claim:

1. A system for the on-site preparation and storage of a sanitizing alkali metal hypochlorite solution comprising:
   (a) a source of deionized or soft water,
   (b) a brine container for holding a saturated brine solution of an alkali metal chloride,
   (c) a water container for holding deionized or soft water,
   (d) means to provide and control the flow of soft water from said source to said brine and water containers,
   (e) an electrolytic chlorine generation unit consisting of one or more cells wherein each cell houses an anode and cathode and is divided into separate anode and cathode compartments separated by a membrane impermeable to chloride ions, each anode compartment having an inlet passageway for receiving a saturated alkali metal chloride brine solution and an outlet passageway for releasing chloride and spent brine, each cathode compartment having an inlet passageway for receiving deionized or soft water and an outlet passageway for releasing hydrogen gas and an alkali metal hydroxide solution.
   (f) means for supplying saturated brine solutions from said brine container to said anode compartments and means for supplying deionized or soft water from said water container to said cathode compartments of said cells.
   (g) means for collecting chlorine and spent brine from the anode compartments of said cells, means for collecting hydrogen and alkali metal hydroxide from the cathode compartments of said cells and receiving means wherein collected chlorine, spent brine, hydrogen and alkali metal hydroxide are intermixed and an alkali metal hypochlorite is formed,
   (h) control means for receiving an AC current and converting it to DC current and applying a DC voltage across the cell or cells of said chlorine generation unit to allow DC current to flow through said unit to produce chlorine at the anode and hydrogen gas at the cathode of each of said cells,
   (i) hypochlorite storage means separately located from said generation unit adapted to receive alkali metal hypochlorite solution from said receiving means said hypochlorite storage means containing a float switch electrically connected to the control means which float switch operates to prevent the flow of electricity to the control means when the alkali metal hypochlorite content in said storage means reaches a predetermined level, and
   (j) at least one thermal switch attached to the electrolytic chlorine generation unit, which switch is sensitive to the temperature within said unit and through which the DC current flowing through said unit must pass such that when a predetermined temperature within said unit is reached, said thermal switch will open interrupting the flow of current through said unit.

2. A system according to claim 1 wherein the means for supplying saturated brine solutions from the brine container to the anode compartments and soft or deionized water from the water container to the cathode compartments of the cells of the chlorine generation unit contains metering means.

3. A system according to claim 2 wherein the metering means consists of two electrically operated pumps which function at a preset pumping rate with one pump being located on a line leading from the brine container to the anode compartments of the chlorine generation unit and the other pump being located on a line leading from the water container to the cathode compartment of the chlorine generation unit.

4. A system according to claim 3, wherein the two pumps are operated by a simple electrical motor which regulates flow rates through each of said pumps.

5. A system according to claim 2 wherein the metering means consists of two valves having openings which function at a preset flow rate with one valve being located on a line leading from the brine container to the anode compartments of the chlorine generation unit and the other valve being located on a line leading from the water container to the cathode compartment of the chlorine generation unit.

6. A system according to claim 3 wherein the chlorine generation unit consists of multiple cells and wherein the DC current flows through said unit in a series relationship.

7. A system according to claim 3 wherein the control unit contains switching means which simultaneously and cyclically operates the pumps and electrolytic chlorine generation unit on a preset time cycle.

* * * * *